US011014546B2

(12) United States Patent
Brennan et al.

(10) Patent No.: US 11,014,546 B2
(45) Date of Patent: May 25, 2021

(54) BRAKE SYSTEM AND METHOD FOR RESPONDING TO EXTERNAL BOOST REQUESTS DURING PREDETERMINED LOSS OR DEGRADED BOOST ASSIST CONDITIONS

(71) Applicant: Autoliv ASP, Inc., Ogden, UT (US)

(72) Inventors: Thomas J. Brennan, Brighton, MI (US); Arnie Spieker, Commerce Township, MI (US)

(73) Assignee: Veoneer-Nissin Brake Systems Japan Co., Ltd., Kanagawa (JP)

( * ) Notice: Subject to any disclaimer, the term of this patent is extended or adjusted under 35 U.S.C. 154(b) by 394 days.

(21) Appl. No.: 15/940,031

(22) Filed: Mar. 29, 2018

(65) Prior Publication Data

US 2019/0299959 A1    Oct. 3, 2019

(51) Int. Cl.
*B60T 17/22* (2006.01)
*B60T 7/04* (2006.01)
(Continued)

(52) U.S. Cl.
CPC ............ *B60T 17/221* (2013.01); *B60T 7/042* (2013.01); *B60T 8/172* (2013.01); *B60T 13/662* (2013.01);
(Continued)

(58) Field of Classification Search
CPC ...... B60T 17/22; B60T 17/221; B60T 17/222; B60T 17/223; B60T 17/225;
(Continued)

(56) References Cited

U.S. PATENT DOCUMENTS

| 5,125,483 A | * | 6/1992 | Kitagawa | ............... B60L 7/003 |
| | | | | 188/1.11 E |
| 5,328,251 A | * | 7/1994 | Brearley | ............... B60T 13/683 |
| | | | | 303/16 |

(Continued)

FOREIGN PATENT DOCUMENTS

| DE | 102005004774 A1 | 9/2005 |
| EP | 1442227 A1 | 8/2004 |

(Continued)

OTHER PUBLICATIONS

International Search Report for PCT/IB2017/058322, ISA/US, Alexandria, dated Apr. 16, 2018.

(Continued)

*Primary Examiner* — Thomas G Black
*Assistant Examiner* — Sara J Lewandroski
(74) *Attorney, Agent, or Firm* — Carrier Blackman & Associates, P.C.; Joseph P. Carrier; William D. Blackman

(57) ABSTRACT

A braking system for a vehicle is disclosed. The braking system may have a primary braking system (PBS) having a boost assist subsystem, and an electronic control unit (ECU) for controlling the PBS and the boost assist subsystem. A memory may be in communication with the ECU. A database may be stored in the memory and may define a plurality of category function codes. The codes may define what levels of braking operation may be provided by the PBS when one of a fault or an anomaly is detected. The ECU may further be configured to implement a brake boost evaluation software module to determine whether to apply a requested level of braking being requested by a subsystem of the vehicle when at least one of a malfunction or anomaly is present.

17 Claims, 3 Drawing Sheets

(51) Int. Cl.
*B60T 8/172* (2006.01)
*B60T 13/74* (2006.01)
*B60T 13/66* (2006.01)

(52) U.S. Cl.
CPC ......... *B60T 13/745* (2013.01); *B60T 2270/40* (2013.01)

(58) Field of Classification Search
CPC ........ B60T 17/226; B60T 17/227; B60T 8/44; B60T 8/441; B60T 8/443; B60T 8/444; B60T 8/445; B60T 8/446; B60T 13/143; B60T 13/145; B60T 13/162; B60T 13/165; B60T 13/166
See application file for complete search history.

(56) References Cited

U.S. PATENT DOCUMENTS

| | | | |
|---|---|---|---|
| 5,979,997 | A | 11/1999 | Ohkubo et al. |
| 6,007,164 | A | 12/1999 | Sakai et al. |
| 6,161,904 | A | 12/2000 | Schmidt et al. |
| 6,206,489 | B1 | 3/2001 | Schmidt et al. |
| 6,231,133 | B1 | 5/2001 | Tsukamoto |
| 6,430,943 | B2 | 8/2002 | Pfister et al. |
| 6,450,591 | B1 * | 9/2002 | Kawahata ............ B60T 8/3655 303/122.05 |
| 7,395,907 | B2 | 7/2008 | de Kock et al. |
| 8,851,579 | B2 | 10/2014 | Ohkubo et al. |
| 8,894,159 | B2 | 11/2014 | Nakata et al. |
| 9,409,559 | B2 | 8/2016 | Ozsoylu et al. |
| 9,656,638 | B2 | 5/2017 | Rydsmo et al. |
| 10,220,824 | B2 * | 3/2019 | Tuhro ...................... B60T 7/12 |
| 2002/0050739 | A1 | 5/2002 | Koepff et al. |
| 2002/0166369 | A1 | 11/2002 | Harris et al. |
| 2003/0038538 | A1 | 2/2003 | Niepelt et al. |
| 2004/0041467 | A1 | 3/2004 | Giers et al. |
| 2006/0015231 | A1 * | 1/2006 | Yoshimura ............... B60T 7/12 701/48 |
| 2006/0043790 | A1 | 3/2006 | Spieker |
| 2007/0035179 | A1 | 2/2007 | Kling et al. |
| 2008/0106142 | A1 | 5/2008 | Nishino et al. |
| 2008/0197696 | A1 * | 8/2008 | Degoul ................... B60T 17/22 303/115.4 |
| 2008/0234909 | A1 | 9/2008 | Iwasaki et al. |
| 2008/0265662 | A1 * | 10/2008 | Karnjate ................. B60T 7/06 180/65.27 |
| 2010/0222980 | A1 * | 9/2010 | Berr .................... B60T 17/221 701/77 |
| 2010/0292889 | A1 * | 11/2010 | Cahill ................... B60T 8/885 701/29.1 |
| 2011/0241419 | A1 | 10/2011 | Ohkubo et al. |
| 2012/0235469 | A1 * | 9/2012 | Miyazaki .............. B60T 8/885 303/9.63 |
| 2012/0256477 | A1 | 10/2012 | Miyazaki et al. |
| 2012/0283926 | A1 | 11/2012 | Ito |
| 2013/0197771 | A1 * | 8/2013 | Takeda ................... B60T 13/745 701/70 |
| 2013/0218407 | A1 | 8/2013 | Jungbecker et al. |
| 2013/0241275 | A1 | 9/2013 | Miyazaki et al. |
| 2013/0304313 | A1 * | 11/2013 | Svensson .............. B60T 17/221 701/34.4 |
| 2014/0008965 | A1 | 1/2014 | Ito et al. |
| 2014/0172227 | A1 * | 6/2014 | Tsukidate ................ G05B 9/02 701/29.2 |
| 2014/0265542 | A1 * | 9/2014 | Boswell ................ B60T 13/745 303/3 |
| 2015/0175144 | A1 | 6/2015 | Watanabe |
| 2015/0367828 | A1 | 12/2015 | Oosawa et al. |
| 2016/0167633 | A1 * | 6/2016 | Lau ........................ B60L 3/02 701/22 |
| 2016/0200295 | A1 * | 7/2016 | Nishikawa .............. B60T 1/10 701/70 |
| 2017/0008497 | A1 | 1/2017 | Svensson et al. |
| 2017/0036651 | A1 | 2/2017 | Svensson et al. |
| 2017/0166180 | A1 * | 6/2017 | Chang .................... B60T 17/22 |
| 2018/0043867 | A1 * | 2/2018 | Lemmer ................. F16D 65/18 |
| 2018/0118183 | A1 | 5/2018 | Spieker |
| 2018/0237131 | A1 * | 8/2018 | Cahill ..................... B64C 25/34 |
| 2018/0244255 | A1 * | 8/2018 | Kawai ..................... B60T 7/085 |
| 2019/0193703 | A1 * | 6/2019 | Haag .................... B60T 13/745 |
| 2020/0094801 | A1 * | 3/2020 | Huff ...................... B60T 8/885 |

FOREIGN PATENT DOCUMENTS

| | | |
|---|---|---|
| GB | 2403520 A | 1/2005 |
| JP | 2006-51922 A | 2/2006 |
| JP | 2016-68940 A | 5/2016 |
| WO | 03040586 A1 | 5/2003 |
| WO | WO-2018/043110 A1 | 3/2018 |

OTHER PUBLICATIONS

Written Opinion of the ISA for PCT/IB2017/058322, ISA/US, Alexandria, dated Apr. 16, 2018.
International Search Report for related application PCT/US2018/039299, ISA/US, Alexandria, VA, dated Sep. 19, 2018.
Written Opinion of the ISA for related application PCT/US2018/039299, ISA/US. Alexandria, VA, dated Sep. 19, 2018.
International Search Report and Written Opinion for corresponding Application PCT/IB2019/052546 dated Jul. 30, 2019.
Roberts, Curt M. "System and Method for Dynamic Braking of Motor Associated With Brake Booster Subsystem", U.S Appl. No. 15/581,860, filed Apr. 28, 2018, 25 pages.

* cited by examiner

| Category Definition | | Stability Analysis - per VFS Req503 |
|---|---|---|
| Category 1 | No restrictions - normal function | Normal operation; no stability issues |
| Category 2 | Circuit restrictions, boost function available | Diagonal circuit braking; some imbalance expected; vehicle testing required |
| Category 3 | Modified control, boosted braking available | Boost available on all circuits; no stability issues |
| Category 4 | Fallback with EPB assist | Blending of EPB assist to be evaluated for each vehicle application to insure stability |
| Category 5 | Full fallback | No boost available; stability will be based on foundation brake (F-R) balance |
| Category 6 | Full fallback, but AEB available | No boost available; stability will be based on foundation brake (F-R) balance |

FIGURE 2

BRAKE SYSTEM AND METHOD FOR RESPONDING TO EXTERNAL BOOST REQUESTS DURING PREDETERMINED LOSS OR DEGRADED BOOST ASSIST CONDITIONS

FIELD

The present disclosure relates to braking systems for motor vehicles, and more particularly to a system and method for enabling non-driver brake requests to be generated by a brake boost assist subsystem of a vehicle brake system, when requested by a vehicle subsystem, even though the brake system is experiencing one or more predetermined, detected conditions where brake boost has been interrupted or degraded.

BACKGROUND

The statements in this section merely provide background information related to the present disclosure and may not constitute prior art.

Modern day braking systems used on motor vehicles such as passenger cars and trucks often employ a Primary Brake System ("PBS") and a Secondary Brake System ("SBS") which are hydraulically connected in series. The PBS provides the main means for generating brake pressure to the brake calipers associated with the four wheels of the vehicle. The PBS does this while constantly monitoring the hydraulic fluid that it applies and the pressure it generates, internal to the PBS itself. The SBS also forms a backup braking system which is able to hydraulically control the brake fluid applied to at least two brakes of the vehicle in the event that a failure occurs in the PBS. The PBS includes a slave cylinder that can be used to develop a pressure boost signal that can be used to aid in building pressure in the PBS, to thus aid the user in braking the vehicle.

Such modern day braking systems as described above have the capability to ignore, interrupt or degrade brake boost in the event an anomaly is detected somewhere in the braking system. The anomaly may be with a sensor being used to read a pressure (e.g., master cylinder pressure), a distance travel of a component (e.g., pedal travel), a position of a valve (e.g., master cut valve (MCV)), etc. However, instances may exist in which a detected anomaly is present, and an electronic control unit (ECU) associated with the braking system has interrupted or degraded the brake boost, but the capability of the braking system to provide requested brake boost is still present. In other words, an anomaly may be present with a component (sensor, valve, etc.) in the PBS, but the anomaly does not hinder the ability for the PBS to respond to a non-driver brake request to help with vehicle braking. This situation, although expected to be somewhat rare, would nevertheless prevent some other subsystem of the vehicle, for example an autonomous braking subsystem responding to an emergency braking situation, from responding to a request for braking while the anomaly is present, even though the requested braking could actually be generated by the PBS and used to help brake the vehicle.

Accordingly, it would be highly advantageous if the braking system was provided with the intelligence/capability to evaluate a detected anomaly and determine if a non-driver brake request can still be applied, if the braking is being requested by one of the vehicle subsystems.

SUMMARY

In one aspect the present disclosure relates to a braking system for a vehicle. The system may comprise a primary braking system (PBS) having a boost assist subsystem, an electronic control unit (ECU) for controlling the PBS and the boost assist subsystem, and a memory in communication with the ECU. The system may further include a database stored in the memory and defining a plurality of category function codes defining what levels of braking operation may be provided by the PBS when one of a fault or an anomaly is detected. The ECU may be being configured to implement a brake boost evaluation software module to determine whether to apply the requested level of braking when requested by a subsystem of the vehicle when at least one of a malfunction or anomaly is present.

In another aspect the present disclosure relates to a braking system for a vehicle. The system may comprise a primary braking system (PBS), a boost assist subsystem and an electronic control unit (ECU) for controlling the PBS and the boost assist subsystem. The system may further include a non-volatile memory in communication with the ECU, and a database. The database may be stored in the memory and may define a plurality of category function codes. The function codes may define what levels of braking operation may be provided by the PBS when one of a plurality of different faults or anomalies is detected by the ECU. The ECU may be configured to implement a braking request evaluation software module to determine, in real time, whether or not a requested level of braking meets a minimum predetermined level of braking, before determining whether to control the brake boost assist subsystem to generate the requested level of braking.

In still another aspect the present disclosure relates to a method for forming a braking system for a vehicle. The method may comprise detecting when a fault or anomaly has occurred which affects operation of at least one of a primary braking system (PBS) and a secondary braking system (SBS) of a vehicle. The method may further include, while the detected fault or anomaly is present, determining if requested boost assist can still be provided by a boost assist subsystem of the vehicle to assist in braking the vehicle. When requested boost assist can still be provided, then in response to a request from a vehicle subsystem or component for a quantity of boost assist, the method may involve providing the requested quantity of boost assist to help in braking the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a drawing showing one example of different function categories that may be constructed for defining the level/type of braking performance that may be provided by the braking system.

DETAILED DESCRIPTION

Figure 1:
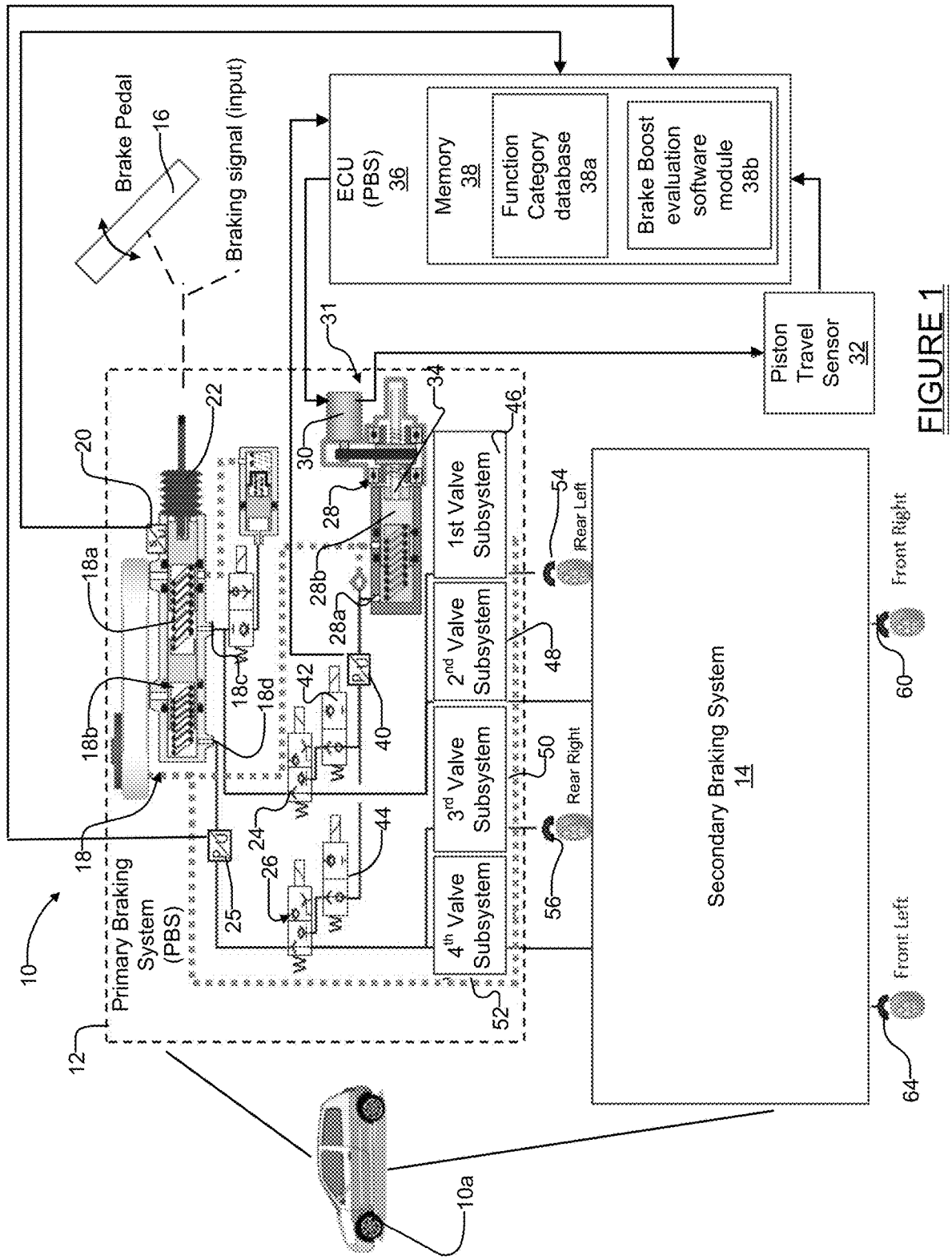
FIG. 1 shows a high level block diagram of one embodiment of a system of the present disclosure in which the system is able to detect a fault or anomaly affecting the braking system, and to perform a real time sequence of operations to determine if requested braking can be generated by the braking system during the fault or anomaly, if the braking is being requested by a vehicle subsystem.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a system 10 in accordance with one embodiment of the present disclosure. The system 10 includes a Primary Braking System ("PBS") 12 and a Secondary Braking System 14 ("SBS") which are connected hydraulically in series, and used to provide braking for a motor vehicle 10a. The system 10 is not limited to use with any particular type of vehicle, and is expected find use with cars, trucks and potentially even with vehicles having autonomous driving capability.

The PBS 12 may include a brake pedal 16 or other component which provides an input braking signal to a master cylinder 18. The master cylinder includes a stroke sensor 20 for sensing a stroke of the brake pedal 16 (assuming a brake pedal is incorporated). A pedal feel simulator valve ("PFSV") 22 may be in communication with an output port 18c of a primary circuit portion 18a of the master cylinder 18 and also with a primary circuit first master cut valve ("MCV") 24. A secondary circuit portion 18b of the master cylinder 18 may be in communication with a first pressure sensor 25 via an output port 18d, which is in turn in communication with a primary circuit second MCV 26.

The PBS 12 further may include a slave cylinder 28 having a cylinder portion 28b with an output port 28a. An electric motor 30 operably associated with the slave cylinder 28 may be used to drive a slave cylinder piston 34 residing within the cylinder portion 28b linearly in response to commands from an electronic control unit (ECU) 36 of the PBS 12. The slave cylinder 28 and the electric motor 30 are used to help generate fluid pressure in the PBS 12 and the SBS 14, and effectively form a brake boost assist subsystem 31. A piston travel sensor 32 may monitor the real time travel of the slave cylinder piston 34 and provide this information to the ECU 36. The ECU 36 may include, or may be in communication with, a non-volatile memory 38 such as a random access memory or a read only memory, and may also receive signals from the stroke sensor 20. The loss of the master cylinder ("MC") pressure and/or MC stroke inputs, though unlikely, are still possible and foreseeable failures, for which a specific function category code (e.g., code 6 to be discussed below) may be assigned and used.

Additionally, while the above description provides one example of a specific brake system with which the teachings of the present disclosure may be implemented, the teachings presented herein could be used with virtually any type of brake-by-wire type braking system (i.e., in a Category 6 mode). Also, it will be appreciated that the SBS 14 is not required for this type of mode to be used. It will also be appreciated that the brake boost assist system described above could be configured in an alternative manner (i.e., a spool valve and a hydraulic pump/accumulator to provide isolated boosted braking).

The memory 38 may include a function category database 38a which contains categories under which various faults or sensor anomalies are classified, and which is used by the system 10 to determine if requested brake boost can be applied, even while a fault or sensor anomaly is present. This important feature of the system 10 will be described in greater detail in the following paragraphs. The memory 38 may also contain a brake boost evaluation software module 38b, which will be discussed in greater detail in connection with FIG. 2 in the following paragraphs.

The output port 28a of the slave cylinder 28 may be in communication with a pressure sensor 40, which in turn may be in communication with a first apply valve (APV) 42 and a second APV 44. The first and second APVs 42 and 44 may be in communication with MCVs 24 and 26, respectively. In this manner fluid pressure generated by the slave cylinder 28 can be used to help pressurize both the PBS 12 and the SBS 14.

The first MCV 24 may be in communication with first and second valve subsystems 46 and 48, respectively. The second MCV 26 may be in communication with third and fourth valve subsystems 50 and 52, respectively. First valve subsystem 46 in this example controls the flow of hydraulic fluid flow to the rear left brake caliper 54, while third valve subsystem 50 controls the hydraulic fluid flow to a rear right brake caliper 56. Second valve subsystem 48 and the fourth valve subsystem 52 communicate with valves with the SBS 14 to control the hydraulic flow to a front right brake caliper 60 and a front left brake caliper 64.

The construction and operation of the valving associated with the PBS 12 and the SBS 14, as described above, is generally known in the art, and has been provided merely as one example of a modern day braking system in which the present invention may be implemented. It will be appreciated, however, that the system 10 of the present disclosure is not limited to this exact configuration of components, but may be used with hydraulic braking systems that differ from the construction provided above.

Referring to FIG. 2, one example of the function category database 38a is shown. The function category database 38a constructed during design of the system 10 and categorizes the different types of braking control schemes that the system 10 may implement, depending on the fault condition or anomaly that is detected. In this example six distinct categories are shown, although the system 10 could be modified to identify greater or fewer than six distinct control schemes. The "Category Definition" defines the type of braking control scheme that may be implemented, while the "Stability Analysis" column defines whether any braking or stability imbalance is to be expected from a particular category of braking scheme. For example, the "Category 4" defines that a fallback braking mode (i.e., no brake boost available whatsoever) is implemented with electronic parking brake (EPB) assist. The "Category 5" designation means that full fallback is available. For example, "full fallback" in this example means that all four brakes are actuated by the driver via the brake pedal 16 and the master cylinder 18. This can be achieved without electrical power or sensing. In fallback with electric parking brake ("EPB") assist, the front brakes are actuated by the driver via the brake pedal 16 and master cylinder 18 and the rear brakes are actuated by the EPB system, based on the measured braking input.

The "Category 6" definition defines a braking mode where full fallback braking operation is implemented, but Autonomous Emergency Braking ("AEB") is still available.

The construction of the category function definitions described above may take into account a wide variety of braking component malfunctions or anomalies. Such malfunctions or anomalies may include, for example and without limitation, hydraulic leaks present at one or more braking components, loss of power to the ECU 22 or other electronic components used for controlling the PBS 12 and the SBS 14, failure of the motor 30 or one of its electronic control components (e.g., FETs/drivers), failure of the pedal feel simulator valve, failure of one or more wheel outlet valves, leaking or stuck APV valves, sensed brake fluid level, steering angle sensor malfunction, controller area network (CAN) based inertial signals indicating an anomaly, motor position sensor failure, etc., or battery feed failure, master cylinder stroke sensor failure, etc.

Figure 3:
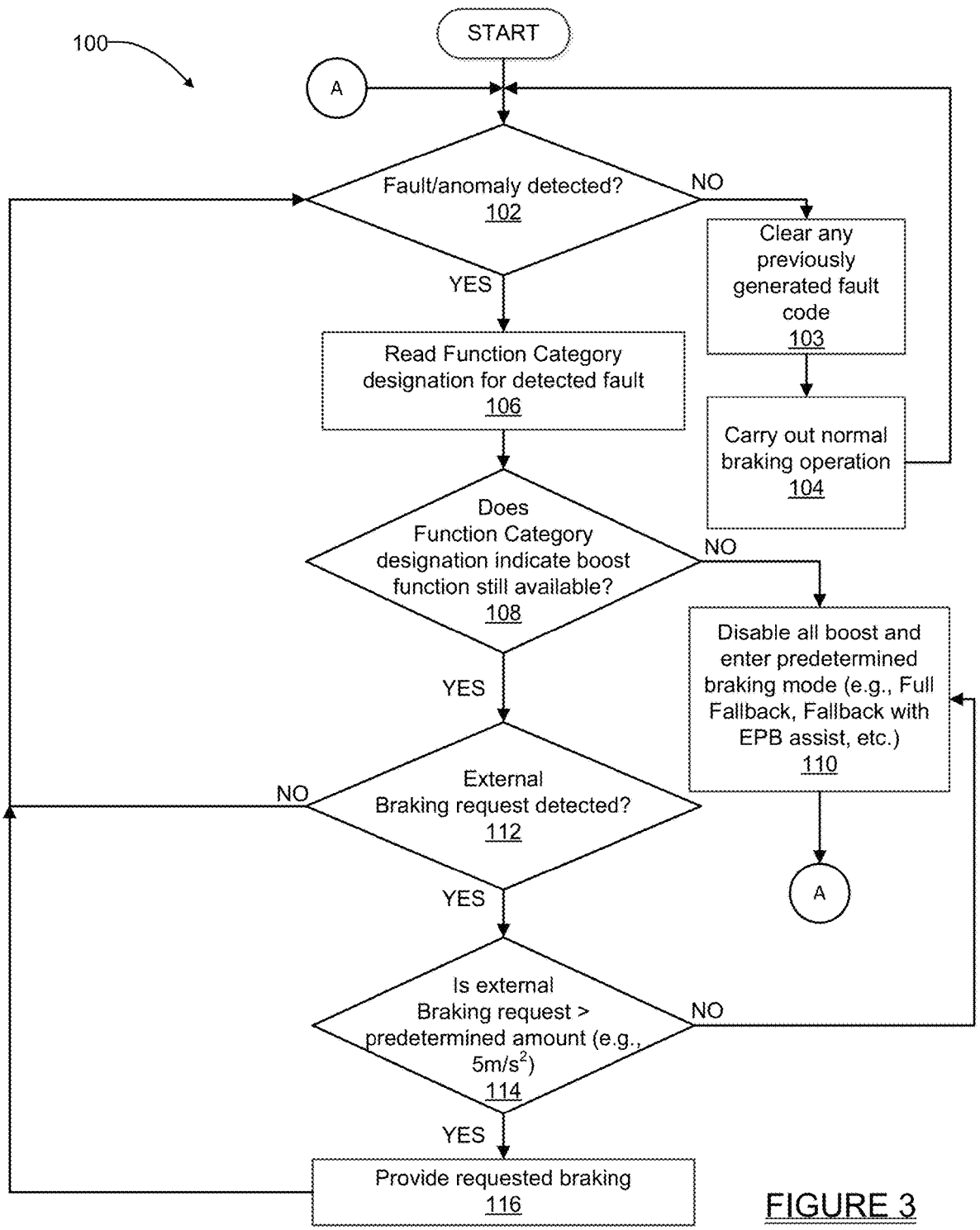
FIG. 3 is a high level flowchart illustrating a plurality of operations that may be performed by an ECU of the braking system to evaluate an error condition, and to determine if a level of requested braking can still be applied, if requested by some vehicle subsystem, to help brake the vehicle while the error condition is present.

Referring to FIG. 3, a flowchart 100 is shown setting forth one example of a plurality of operations that may be performed by the brake boost evaluation software module 38*b*. At operation 102 a check is made for any fault or anomaly within the system 10. By "fault" it is meant a signal received by the ECU 36 indicating that a specific component has malfunctioned. By "anomaly" it is meant a condition (e.g., low pressure) that is detected or sensed by the system 10 which may compromise full performance of the braking capability by the PBS 12 and/or the SBS 14, but for which a specific malfunctioning component has not yet been identified.

If the check at operation 102 produces a "No" answer, meaning that all components and aspects of the system 10 are operating properly, then at operation 103 any previously generated fault code may be cleared, and normal operation of the system 10 is continued or resumed, as indicated at operation 104. Operation 102 may then be re-performed.

If the check at operation 102 indicates a fault or anomaly is present, then at operation 106 the ECU 36 reads the function category designation for the detected fault or anomaly. This involves the ECU 36 checking the function category database 38*a* in the memory 38. In this regard it should be appreciated that the memory 38 is a non-volatile memory, and the information stored therein is always readily available to the ECU 36, assuming no problem with the memory 38 itself exists.

At operation 108, the ECU uses the category function designation to determine if the boost function is still available, meaning that the requested braking can still be generated to help with braking the vehicle 10 *a*. If the answer at operation 108 is "No", then the ECU 36 disables all boost and enters a predetermined braking mode, for example "Fallback" with EPB assist, or any other predetermined braking mode or scheme.

If the check at operation 108 produces a "Yes" answer, indicating that the function category designation allows for some level of requested braking to be provided to the PBS 12 and/or the SBS 12, then the ECU makes another check at operation 112 to determine if a braking request has been made (or is currently being made) by some subsystem of the vehicle. One subsystem, for example, might be an autonomous emergency braking (AEB) subsystem of the vehicle 10*a* that calls for braking to be implement an emergency braking maneuver.

If the check at operation 112 provides a "No" answer, then operation 102 may be re-performed. However, if the external braking request check at operation 112 produces a "Yes" answer, then at operation 114 the ECU 22 may determine if the external braking request is requesting braking greater than a predetermined amount, for example greater than 5 m/s$^2$. It will be appreciated the 5 m/s$^2$ figure in this example is intended as a method to limit this functionality to emergency systems only (i.e., Automatic Emergency Braking would command a high level of braking, while Automated cruise control (a comfort feature) would command a lower level of braking). It will be appreciated that this function can also be achieved based on the command source.

If the check at operation 114 produces a "No" answer, then operation 110 may be performed. In this situation, only a relatively small amount of braking is being requested by the vehicle subsystem, so this request is ignored by the system 10. However, if the requested braking is greater than the predetermined amount or from an appropriate source, then the ECU 22 controls the PBS 12 to provide the requested braking, as indicated at operation 116. The system 10 may then re-perform operation 102.

The system 10 and method of the present disclosure thus provides the capability to check and determine if requested braking can still be provided, in real time, while an error condition or anomaly is detected as being present, and goes even further to make a determination, in real time, if the requested braking is sufficiently significant that it should be provided by the system 10.

The system 10 and method of the present disclosure also provides the significant advantage of being easily retrofitted into existing vehicles that include a PBS 12. In most implementations, this retrofitting may be accomplished without the need to make any hardware modifications to the PBS 12 or the SBS 14.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A braking system for a vehicle for enabling non-driver brake requests to be generated by a brake boost assist subsystem of the braking system, when requested by a vehicle subsystem, even though the braking system is experiencing a fault or an anomaly, the braking system comprising:
    a primary braking system (PBS) having the brake boost assist subsystem;
    an electronic control unit (ECU) for controlling the PBS and the brake boost assist subsystem;
    a memory in communication with the ECU;
    a database stored in the memory and defining a plurality of category function codes defining what levels of braking operation may be provided by the PBS when one of a fault or an anomaly is detected;
    the ECU further being configured to implement a brake boost evaluation software module to determine whether to apply a requested level of braking being requested by a subsystem of the vehicle when at least one of a fault or anomaly is present,
    the ECU is further configured to determine if the requested level of braking exceeds a predetermined level of braking, before implementing the requested level of braking, and
    wherein the brake boost assist subsystem comprises a slave cylinder and an electric motor.

2. The braking system of claim 1, wherein when the ECU determines that it is appropriate to apply the requested level of braking being requested by a subsystem of the vehicle, the ECU controls the brake boost assist subsystem to apply the requested level of braking being requested, and when the ECU determines that it is not appropriate to apply the requested level of braking being requested by a subsystem of the vehicle, the ECU disables all boost from the brake boost assist subsystem and enters a predetermined braking mode which does not involve the brake boost assist subsystem.

3. The braking system of claim 1, wherein when the ECU determines that the requested level of braking does not meet the predetermined level of braking, the ECU does not implement any braking from the brake boost assist subsystem.

4. The braking system of claim 1, wherein the memory is used to store a plurality of different function category codes, with each said function category code defining a specific level of braking performance to be provided by the PBS and the brake boost assist subsystem.

5. The braking system of claim 1, wherein the memory comprises a non-volatile memory.

6. The braking system of claim 1, wherein the ECU communicates with the electric motor to command a level of brake boost assist being requested.

7. A braking system for a vehicle for enabling non-driver brake requests to be generated by a brake boost assist subsystem of the braking system, when requested by a vehicle subsystem, even though the braking system is experiencing a fault or an anomaly, the braking system comprising:
    a primary braking system (PBS);
    a brake boost assist subsystem including a slave cylinder and an electric motor;
    an electronic control unit (ECU) for controlling the PBS and the brake boost assist subsystem;
    a non-volatile memory in communication with the ECU;
    a database stored in the memory and defining a plurality of category function codes defining what levels of braking operation may be provided by the PBS when one of a plurality of different faults or anomalies is detected by the ECU; and
    the ECU further being configured to implement a brake boost evaluation software module to determine, in real time, whether or not a requested level of braking meets a minimum predetermined level of braking, before determining whether to control the brake boost assist subsystem to generate the requested level of braking.

8. The braking system of claim 7, wherein when the ECU determines that the quantity of brake boost is able to be applied when one of the plurality of different faults or anomalies has been detected by the ECU the ECU controls the brake boost assist subsystem to apply the requested level of braking, and when the ECU determines that the quantity of brake boost is not able to be applied when one of the plurality of different faults or anomalies has been detected by the ECU, the ECU disables all boost from the brake boost assist subsystem and enters a predetermined braking mode which does not involve the brake boost assist subsystem.

9. The braking system of claim 7, wherein the electric motor is responsive to the commands from the ECU.

10. The braking system of claim 9, wherein the memory stores a database comprising a plurality of category function codes each defining a different level of braking performance to be implemented by the PBS.

11. The braking system of claim 10, wherein before the brake boost evaluation software module determines whether or not the requested level of braking meets the minimum predetermined level of braking, the brake boost evaluation software module determines whether a quantity of brake boost is able to be applied when one of the plurality of different faults or anomalies has been detected by the ECU.

12. The braking system of claim 10, wherein the brake boost evaluation software module initially evaluates if a quantity of brake boost is able to be applied in view of the detected fault or anomaly.

13. The braking system of claim 7, further comprising a stroke sensor for sensing a stroke of a brake pedal and providing a signal corresponding thereto to the ECU, from which the braking system is configured to detect a loss of the stroke sensor signal and, when a loss of the stroke sensor signal is detected, to address the loss with a specific category function code.

14. A method for enabling non-driver brake requests to be generated by a brake boost assist subsystem of a braking system of a vehicle, when requested by a vehicle subsystem, even though the braking system is experiencing a fault or an anomaly, the method comprising:
    detecting when a fault or anomaly has occurred which affects operation of at least one of a primary braking system (PBS) and a secondary braking system (SBS) of a vehicle;
    while the detected fault or anomaly is present, detecting if non-driver requested braking can be provided by the brake boost assist subsystem of the vehicle to assist in braking the vehicle even though the detected fault or anomaly is present;
    if requested braking can be provided, then in response to a request from a vehicle subsystem or component for a quantity of braking, providing the requested quantity of braking to help in braking the vehicle; and
    comparing the level of braking being requested by the vehicle subsystem to a predetermined level of braking, and only generating the requested level of braking when the requested level of braking exceeds the predetermined level of braking,
    wherein the brake boost assist subsystem includes a slave cylinder and an electric motor.

15. The method of claim 14, wherein said detecting if requested braking can be provided comprises using an electronic control unit (ECU) to check a stored database of codes, wherein the codes each define a level of braking corresponding to a specified fault or anomaly.

16. The method of claim 15, further comprising storing the database of codes in a non-volatile memory in communication with the ECU.

17. The method of claim 16, further comprising evaluating a level of braking being requested by the vehicle subsystem before determining whether to apply the requested level of braking.

* * * * *